United States Patent
Hajji et al.

(10) Patent No.: US 11,312,887 B2
(45) Date of Patent: *Apr. 26, 2022

(54) EPOXY ADHESIVE COMPOSITION COMPRISING A MULTISTAGE POLYMER AND A (METH)ACRYLIC POLYMER, ITS METHOD OF PREPARATION AND ITS USE

(71) Applicant: Arkema France, Colombes (FR)

(72) Inventors: Philippe Hajji, Chatillon d'Azergues (FR); Rosangela Pirri, Montardon (FR); Rabi Inoubli, Villeurbanne (FR)

(73) Assignee: Arkema France, Colombes (FR)

( * ) Notice: Subject to any disclaimer, the term of this patent is extended or adjusted under 35 U.S.C. 154(b) by 5 days.

This patent is subject to a terminal disclaimer.

(21) Appl. No.: 16/628,289

(22) PCT Filed: Jul. 12, 2018

(86) PCT No.: PCT/EP2018/069027
§ 371 (c)(1),
(2) Date: Jan. 3, 2020

(87) PCT Pub. No.: WO2019/012077
PCT Pub. Date: Jan. 17, 2019

(65) Prior Publication Data
US 2020/0172773 A1    Jun. 4, 2020

(30) Foreign Application Priority Data
Jul. 12, 2017 (FR) .................................. FR17.56648

(51) Int. Cl.
| | | |
|---|---|---|
| *C09J 163/00* | (2006.01) | |
| *C08F 20/06* | (2006.01) | |
| *C08K 5/00* | (2006.01) | |
| *C09J 133/10* | (2006.01) | |

(52) U.S. Cl.
CPC ............ *C09J 163/00* (2013.01); *C08F 20/06* (2013.01); *C08K 5/0025* (2013.01); *C09J 133/10* (2013.01)

(58) Field of Classification Search
CPC ..................................................... C09J 163/00

USPC ......................... 523/427, 428, 464; 156/330
See application file for complete search history.

(56) References Cited

U.S. PATENT DOCUMENTS

| | | |
|---|---|---|
| 4,764,555 A | 8/1988 | Shigemitsu et al. |
| 8,729,197 B2 | 5/2014 | Kropp |
| 10,513,603 B2 * | 12/2019 | Inoubli .................... C08L 33/10 |
| 2007/0027233 A1 | 2/2007 | Yamaguchi et al. |
| 2007/0027263 A1 | 2/2007 | Furukawa et al. |
| 2008/0200589 A1 * | 8/2008 | Hubschmid ............. C08L 53/00 523/436 |
| 2009/0308534 A1 | 12/2009 | Malone |
| 2010/0099800 A1 | 4/2010 | Ueno et al. |
| 2011/0003947 A1 * | 1/2011 | Kishi ...................... C08L 63/00 525/92 H |
| 2011/0024039 A1 | 2/2011 | Campbell et al. |
| 2012/0157601 A1 * | 6/2012 | Navarro .................. C08L 69/00 524/501 |
| 2012/0157628 A1 | 6/2012 | Navarro et al. |
| 2017/0369696 A1 | 12/2017 | Inoubli et al. |
| 2018/0002520 A1 | 1/2018 | Inoubli et al. |

FOREIGN PATENT DOCUMENTS

| | | | |
|---|---|---|---|
| EP | 0 066 382 A1 | 12/1982 | |
| FR | 2934866 A1 | 2/2010 | |
| WO | WO-2016102666 A1 * | 6/2016 | ................ C08J 3/22 |

* cited by examiner

*Primary Examiner* — Michael J Feely
(74) *Attorney, Agent, or Firm* — Lynn B. Morreale

(57) ABSTRACT

The present invention relates to a composition suitable as epoxy adhesive composition comprising a multistage polymer in form of polymeric particles and a (meth)acrylic polymer its process of preparation and its use. In particular the present invention relates to a structural epoxy adhesive composition comprising a multistage polymer in form of polymeric particles made by a multistage process and a (meth)acrylic polymer its process of preparation and its use. More particularly the present invention relates to structural (epoxy adhesive composition made from a two part composition or a one part composition comprising a multistage polymer in form of polymeric particles made by a multistage process and a (meth)acrylic polymer its process of preparation and its use.

16 Claims, No Drawings

EPOXY ADHESIVE COMPOSITION COMPRISING A MULTISTAGE POLYMER AND A (METH)ACRYLIC POLYMER, ITS METHOD OF PREPARATION AND ITS USE

CROSS-REFERENCE TO RELATED APPLICATIONS

This application is a national stage application under 35 U.S.C. § 371 of PCT/EP2018/069027, filed Jul. 12, 2018 which claims benefit to application FR 17 56648, filed Jul. 12, 2017.

FIELD OF THE INVENTION

The present invention relates to a composition suitable as epoxy adhesive composition comprising a multistage polymer in form of polymeric particles and a (meth)acrylic polymer its process of preparation and its use.

In particular the present invention relates to a structural epoxy adhesive composition comprising a multistage polymer in form of polymeric particles made by a multistage process and a (meth)acrylic polymer its process of preparation and its use.

More particularly the present invention relates to structural (epoxy adhesive composition made from a two part composition or a one part composition comprising a multistage polymer in form of polymeric particles made by a multistage process and a (meth)acrylic polymer its process of preparation and its use.

TECHNICAL PROBLEM

Structural adhesives are materials of high strength and performance. Their function is primary function is to hold structures together and to be capable of resisting high loads.

Thermosetting epoxy adhesives are rubber-toughened systems that cure rapidly at room temperature to provide a crosslinked structural adhesive suitable for bonding metals, engineering plastics, and many other substrates with minimal surface preparation.

They provide a high tensile shear and peel strength, chemical resistance, and impact strength. The formulation uses the addition of core-shell block and graft polymers, which swell in size in the adhesive formulation but do not dissolve. These additives give also improved spreading and flow properties to the adhesive.

The core-shell polymer have to be distributed homogeneously throughout the adhesive in order to guaranty a satisfying impact performance of the adhesive. This homogenous distribution is not easily achieved with all kind of core shell impact modifiers.

Additionally the elongation at break is relatively low for standard epoxy structural adhesives.

The adhesion of such epoxy structural adhesives should be increased as well.

The objective of the present invention is to propose a multistage polymer composition which is rapidly and easily dispersible in liquid and/or reactive epoxy resins suitable for epoxy adhesive compositions.

An objective of the present invention is also to propose a multistage polymer composition which is easily dispersible in liquid and/or reactive resins in form of a polymer powder suitable for epoxy adhesive compositions.

An additional objective of the present invention is to propose structural epoxy adhesive polymer composition that has improved impact performance and toughness and a high strength, while having at the same time an increased elongation at break.

An additional objective of the present invention is to propose structural epoxy adhesive polymer composition that has satisfying impact performance and a high strength, while having at the same time an increased adhesion (lap shear).

Another objective of the present invention is to propose a method for structural epoxy adhesive polymer composition which comprises a multistage polymer having a core-shell structure, that is easily dispersible in in liquid and/or reactive resins.

Still another objective of the present invention is a method for preparing a liquid polymer composition comprising an epoxy component, a curing agent and a multistage polymer having a core-shell structure, with a homogenous distribution of the multistage polymer.

Still a further objective of the present invention is the use of a liquid polymer composition comprising an epoxy component, a curing agent and a multistage polymer having a core-shell structure, with a homogenous distribution of the multistage polymer for preparing structural epoxy adhesive.

[BACKGROUND OF THE INVENTION] PRIOR ART

The document US2009/0308534 discloses a highly toughened two part structural epoxy adhesive composition. The composition comprises core-shell particles.

The document WO2009/126862 discloses a one part epoxy based structural adhesive comprising toughening agents. The preferred toughening agents are core shell polymers.

The document WO2012/021258 discloses an epoxy structural adhesive. The adhesive comprises toughening agents that are in some embodiment's core shell impact modifiers.

The document WO2016/102666 discloses a composition comprising a multistage polymer. The composition comprises as well a (meth)acrylic polymer (P1) having a mass average molecular weight of less than 100 000 g/mol, but with giving a specific ratio of the (meth)acrylic polymer (P1).

None of the prior art documents discloses an epoxy adhesive composition comprising a multistage polymer in form of polymeric particles combined with an additional polymer having a specific molecular weight and weight ratio.

BRIEF DESCRIPTION OF THE INVENTION

Surprisingly it has been found that a polymer composition comprising
 a) a first part composition (P1) comprising
  a1) an epoxy resin,
  a2) a multistage polymer (MP1) having a core-shell structure,
  a3) a polymer (C1),
 and
 b) a second part composition (P2) comprising
  b1) a curing agent,
characterized in that the polymer (C1) is having a mass average molecular weight Mw between 2 000 g/mol and 1 000 000 g/mol, is suitable as epoxy adhesive composition.

Surprisingly it has been found that a polymer composition comprising
- a) a first part composition (P1) comprising
    - a1) an epoxy resin,
    - a2) a multistage polymer (MP1) having a core-shell structure,
    - a3) a polymer (C1),
    and
- b) a second part composition (P2) comprising
    - b1) a curing agent, characterized in that the polymer (C1) is having a mass average molecular weight Mw between 2 000 g/mol and 1 000 000 g/mol, yields to epoxy adhesive composition having increase elongation at break, toughness and shear strength adhesion.

Surprisingly it has also been found that a method for manufacturing the polymer composition suitable as epoxy adhesive composition comprising the steps of
- (a) providing a first part composition (P1) comprising
    - a1) an epoxy resin),
    - a2) a multistage polymer (MP1) having a core-shell structure,
    - a3) a polymer (C1);
- (b) providing a second part composition (P2) comprising
    - b1) a curing agent
- (c) curing the mixture of (P1) and (P2)

characterized in that the polymer (C1) is having a mass average molecular weight Mw between 2 000 g/mol and 1 000 000 g/mol, yields to epoxy adhesive composition having increase elongation at break, toughness and shear strength adhesion Surprisingly it has also been found that a polymer composition comprising
- a) a first part composition (P1) comprising
    - a1) an epoxy resin,
    - a2) a multistage polymer (MP1) having a core-shell structure,
    - a3) a polymer (C1),
    and
- b) a second part composition (P2) comprising
    - b1) a curing agent, characterized in that the polymer (C1) is having a mass average molecular weight Mw between 2 000 g/mol and 1 000 000 g/mol, can be used for epoxy adhesive composition having increase elongation at break, toughness and shear strength adhesion.

DETAILED DESCRIPTION OF THE INVENTION

According to a first aspect, the present invention relates to a composition suitable as epoxy adhesive composition comprising
- a) a first part composition (P1) comprising
    - a1) an epoxy resin,
    - a2) a multistage polymer (MP1) having a core-shell structure,
    - a3) a polymer (C1),
    and
- b) a second part composition (P2) comprising
    - b1) a curing agent, characterized in that the polymer (C1) is having a mass average molecular weight Mw between 2 000 g/mol and 1 000 000 g/mol.

According to a second aspect, the present invention relates to a method for manufacturing the polymer composition suitable as epoxy adhesive composition comprising the steps of
- (a) providing a first part composition (P1) comprising
    - a1) an epoxy resin),
    - a2) a multistage polymer (MP1) having a core-shell structure,
    - a3) a polymer (C1);
- (b) providing a second part composition (P2) comprising
    - b1) a curing agent
- (c) curing the mixture of (P1) and (P2)

characterized in that the polymer (C1) is having a mass average molecular weight Mw between 2 000 g/mol and 1 000 000 g/mol.

In a third aspect the present invention relates to a structural adhesive polymer composition comprising
- a) a first part composition (P1) comprising
    - a1) an epoxy resin,
    - a2) a multistage polymer (MP1) having a core-shell structure,
    - a3) a polymer (C1),
    and
- b) a second part composition (P2) comprising
    - b1) a curing agent, characterized in that the polymer (C1) is having a mass average molecular weight Mw between 2 000 g/mol and 1 000 000 g/mol.

In a fourth aspect the present invention relates to the use of a polymer composition comprising
- a) a first part composition (P1) comprising
    - a1) an epoxy resin,
    - a2) a multistage polymer (MP1) having a core-shell structure,
    - a3) a polymer (C1),
    and
- b) a second part composition (P2) comprising
    - b1) a curing agent, as structural adhesive.

By the term "polymer powder" as used is denoted a polymer comprising powder grain in the range of at least fpm obtained by agglomeration of primary polymer comprising particles in the nanometer range.

By the term "primary particle" as used is denoted a spherical polymer comprising particle in the nanometer range. Preferably the primary particle has a weight average particle size between 20 nm and 800 nm.

By the term "particle size" as used is denoted the volume average diameter of a particle considered as spherical.

By the term "thermoplastic polymer" as used is denoted a polymer that turns to a liquid or becomes more liquid or less viscous when heated and that can take on new shapes by the application of heat and pressure.

By the term "epoxy resin" as used is understood any organic compound having at least two functional groups of oxirane type which can be polymerized by ring opening. Once cured the epoxy resin will be a thermoset polymer By the term "thermosetting polymer" as used is denoted a prepolymer in a soft, solid or viscous state that changes irreversibly into an infusible, insoluble polymer network by curing.

By the term "copolymer" as used is denoted that the polymer consists of at least two different monomers.

By "multistage polymer" as used is denoted a polymer formed in sequential fashion by a multi-stage polymerization process. Preferred is a multi-stage emulsion polymerization process in which the first polymer is a first-stage polymer and the second polymer is a second-stage polymer, i.e., the second polymer is formed by emulsion polymerization in the presence of the first emulsion polymer, with at least two stages that are different in composition.

By the term "(meth) acrylic" as used is denoted all kind of acrylic and methacrylic monomers.

By the term "(meth)acrylic polymer" as used is denoted that the (meth)acrylic) polymer comprises essentially polymers comprising (meth)acrylic monomers that make up 50 wt % or more of the (meth)acrylic polymer.

By the term "dry" as used is denoted that the ratio of residual water is less than 1.5 wt and preferably less than 1 wt %.

By saying that a range from x to y in the present invention, it is meant that the upper and lower limit of this range are included, equivalent to at least x and up to y.

By saying that a range is between x and y in the present invention, it is meant that the upper and lower limit of this range are excluded, equivalent to more than x and less than y.

With regard to the polymeric composition according to the invention, it is a two part epoxy adhesive composition that comprises a first part composition (P1) and a second part composition (P2).

The first part (P1) comprises at least the following components: a1) an epoxy resin, a2) a multistage polymer (MP1) having a core-shell structure and a3) a polymer (C1).

The epoxy resin represents at least 20 wt % of the sum of all components of the first part composition (P1). The epoxy resin represents at most 97 wt % of the sum of all components of the first part composition (P1).

The multistage polymer (MP1) represents at least 2 wt % of the sum of all components of the first part composition (P1). The multistage polymer (MP1) represents at most 50 wt % of the sum of all components of the first part composition (P1).

The polymer (C1) represents at least 0.1 wt % % of the sum of all components of the first part composition (P1).

Moreover, the first part composition (P1) comprises preferably optionally one of the following compounds:
a rheology modifier.

The second part composition (P2) comprises at least b1) a polymerization initiator.

Moreover, the second part composition (P2) comprises preferably optionally one of the following compounds:
an accelerator.

With regard to a variation of the polymeric composition according to the invention, it is also possible that the components of first part composition (P1) and a second part composition (P2) are mixed together right away in a one part composition, if the curing conditions allow it. This would be the case if curing implies heating to an elevated temperature and the shelf life is sufficiently long.

With regard to the epoxy resin according to the composition of the invention, it might be a mixture or several epoxy resins.

The epoxy resin may having a functionality of 2 (difunctional) or higher (trifunctional, tetrafunctional etc.).

Suitable epoxy difunctional epoxy resins that are used to form the matrix of the composition may be any suitable difunctional epoxy resin. It will be understood that this includes any suitable epoxy resins having two epoxy functional groups. The difunctional epoxy resin may be saturated, unsaturated, cycloaliphatic, alicyclic or heterocyclic. The difunctional epoxy may be used alone or in combination with multifunctional epoxy resins to form the resin component. Resin components that contain only multifunctional epoxy are also possible.

Difunctional epoxy resins, by way of example, include those based on: diglycidyl ether of Bisphenol F, Bisphenol A (optionally brominated), glycidyl ethers of phenol-aldelyde adducts, glycidyl ethers of aliphatic diols, diglycidyl ether, diethylene glycol diglycidyl ether, Epikote, Epon, aromatic epoxy resins, epoxidised olefins, brominated resins, aromatic glycidyl amines, heterocyclic glycidyl imidines and amides, glycidyl ethers, fluorinated epoxy resins, or any combination thereof. The difunctional epoxy resin is preferably selected from diglycidyl ether of Bisphenol F, diglycidyl ether of Bisphenol A, diglycidyl dihydroxy naphthalene, or any combination thereof. Most preferred is diglycidyl ether of Bisphenol F. Diglycidyl ether of Bisphenol F is available commercially from Huntsman Advanced Materials (Brewster, N.Y.) under the trade names Araldite GY281 and GY285 and from Ciba-Geigy (location) under the trade name LY9703. A difunctional epoxy resin may be used alone or in any suitable combination with other difunctional epoxies or multifunctional epoxies to form the resin component.

The resin component may include one or more epoxy resins with a functionality that is greater than two. Preferred multifunctional epoxy resins are those that are trifunctional or tetrafunctional. The multifunctional epoxy resin may be a combination of trifunctional and multifunctional epoxies. The multifunctional epoxy resins may be saturated, unsaturated, cycloaliphatic, alicyclic or heterocyclic.

Suitable multifunctional epoxy resins, by way of example, include those based upon: phenol and cresol epoxy novolacs, glycidyl ethers of phenol-aldelyde adducts; glycidyl ethers of dialiphatic diols; diglycidyl ether; diethylene glycol diglycidyl ether; aromatic epoxy resins; dialiphatic triglycidyl ethers, aliphatic polyglycidyl ethers; epoxidised olefins; brominated resins; aromatic glycidyl amines; heterocyclic glycidyl imidines and amides; glycidyl ethers; fluorinated epoxy resins or any combination thereof.

A trifunctional epoxy resin will be understood as having the three epoxy groups substituted either directly or indirectly in a para or meta orientation on the phenyl ring in the backbone of the compound. A tetrafunctional epoxy resin will be understood as having the four epoxy groups substituted either directly or indirectly in a meta or para orientation on the phenyl ring in the backbone of the compound.

The phenyl ring may additionally be substituted with other suitable non-epoxy substituent groups. Suitable substituent groups, by way of example, include hydrogen, hydroxyl, alkyl, alkenyl, alkynyl, alkoxyl, aryl, aryloxyl, aralkyloxyl, aralkyl, halo, nitro, or cyano radicals. Suitable non-epoxy substituent groups may be bonded to the phenyl ring at the para or ortho positions, or bonded at a meta position not occupied by an epoxy group. Suitable tetrafunctional epoxy resins include N,N,N',N'-tetraglycidyl-m-xylenediamine (available commercially from Mitsubishi Gas Chemical Company (Chiyoda-Ku, Tokyo, Japan) under the name Tetrad-X), and Erisys GA-240 (from CVC Chemicals, Morrestown, N.J.). Suitable trifunctional epoxy resins, by way of example, include those based upon: phenol and cresol epoxy novolacs; glycidyl ethers of phenol-aldelyde adducts; aromatic epoxy resins; dialiphatic triglycidyl ethers; aliphatic polyglycidyl ethers; epoxidised olefins; brominated resins, aromatic glycidyl amines and glycidyl ethers; heterocyclic glycidyl imidines and amides; glycidyl ethers; fluorinated epoxy resins or any combination thereof.

An exemplary trifunctional epoxy resin is triglycidyl meta-aminophenol. Triglycidyl meta-aminophenol is available commercially from Huntsman Advanced Materials (Monthey, Switzerland) under the trade name Araldite MY0600 and from Sumitomo Chemical Co. (Osaka, Japan) under the trade name ELM-120. Another exemplary trifunctional epoxy resin is triglycidyl para-aminophenol. Triglycidyl para-aminophenol is available commercially from Huntsman Advanced Materials (Monthey, Switzerland) under the trade name Araldite MY0510.

Additional examples of suitable multifunctional epoxy resin include, by way of example, N,N,N',N'-tetraglycidyl-4,4'-diaminodiphenyl methane (TGDDM available commercially as Araldite MY720 and MY721 from Huntsman Advanced Materials (Monthey. Switzerland), or ELM 434 from Sumitomo), triglycidyl ether of para aminophenol (available commercially as Araldite MY 0500 or MY 0510 from Huntsman Advanced Materials), dicyclopentadiene based epoxy resins such as Tactix 556 (available commercially from Huntsman Advanced Materials), tris-(hydroxyl phenyl), and methane-based epoxy resin such as Tactix 742 (available commercially from Huntsman Advanced Materials). Other suitable multifunctional epoxy resins include DEN 438 (from Dow Chemicals, Midland, Mich.), DEN 439 (from Dow Chemicals), Araldite ECN 1273 (from Huntsman Advanced Materials), and Araldite ECN 1299 (from Huntsman Advanced Materials).

With regard to the curing agent according to the invention, it may be an amine comprising compound or an amide compound or an imidazole compound or a mercaptan comprising compound or an anhydride comprising compound.

The multistage polymer (MP1) of the composition according to the invention has at least two stages a) and b) that are different in its polymer composition.

The multistage polymer (MP1) is preferably in form of polymer particles considered as spherical particles. These particles are also called core shell particles. The first stage forms the core, the second or all following stages the respective shells. Such a multistage polymer which is also called core/shell particle is preferred.

The particles according to the invention, which is the primary particle, it has a weight average particle size between 15 nm and 900 nm. Preferably the weight average particle size of the polymer is between 20 nm and 800 nm, more preferably between, more preferably between 25 nm and 600 nm, still more preferably between 30 nm and 550 nm, again still more preferably between 35 nm and 500 nm, advantageously between 40 nm and 400 nm, even more advantageously between 75 nm and 350 nm and advantageously between 80 nm and 300 nm. The primary polymer particles can be agglomerated giving a polymer powder.

The primary polymer particle according to a first preferred embodiment of the invention has a multilayer structure comprising at least one stage (A) comprising a polymer (A1) having a glass transition temperature below 10° C., at least one stage (B) comprising a polymer (B1) having a glass transition temperature over 60° C. and at least one stage (C) comprising a polymer (C1) having a glass transition temperature over 30° C. In this first preferred embodiment the primary polymer particle comprises the components a2) and a3) of the composition according to the invention. The component a2) multistage polymer (MP1) having a core-shell structure, as stage (A) comprising a polymer (A1) having a glass transition temperature below 10° C., at least one stage (B) comprising a polymer (B1) having a glass transition temperature over 60° C. and the component a3) the polymer (C1) as additional stage (C).

Preferably the stage (A) is the first stage of the at least two stages and the stage (B) comprising polymer (B1) is grafted on stage (A) comprising polymer (A1) or another intermediate layer.

There could also be another stage before stage (A), so that stage (A) would also be a shell.

In a first embodiment the polymer (A1) having a glass transition temperature below 10° C. comprises at least 50 wt % of polymeric units coming from alkyl acrylate and the stage (A) is the most inner layer of the polymer particle having the multilayer structure. In other words the stage (A) comprising the polymer (A1) is the core of the polymer particle.

With regard to the polymer (A1) of the first preferred embodiment, it is a (meth) acrylic polymer comprising at least 50 wt % of polymeric units coming from acrylic monomers. Preferably 60 wt % and more preferably 70 wt % of the polymer (A1) are acrylic monomers.

The acrylic monomer in polymer (A1) comprises monomers chosen from C1 to C18 alkyl acrylates or mixtures thereof. More preferably acrylic monomer in polymer (A1) comprises monomers of C2 to C12 alkyl acrylic monomers or mixtures thereof. Still more preferably acrylic monomer in polymer (A1) comprises monomers of C2 to C8 alkyl acrylic monomers or mixtures thereof.

The polymer (A1) can comprise a comonomer or comonomers which are copolymerizable with the acrylic monomer, as long as polymer (A1) is having a glass transition temperature of less than 10° C.

The comonomer or comonomers in polymer (A1) are preferably chosen from (meth)acrylic monomers and/or vinyl monomers.

Most preferably the acrylic or methacrylic comonomers of the polymer (A1) are chosen from methyl acrylate, propyl acrylate, isopropyl acrylate, butyl acrylate, tert-butyl acrylate, methyl methacrylate, ethyl methacrylate, butyl methacrylate and mixtures thereof, as long as polymer (A1) is having a glass transition temperature of less than 10° C.

In a specific embodiment polymer (A1) is a homopolymer of butyl acrylate.

More preferably the glass transition temperature Tg of the polymer (A1) comprising at least 70 wt % of polymeric units coming from C2 to C8 alkyl acrylate is between −100° C. and 10° C., even more preferably between −80° C. and 0° C. and advantageously between −80° C. and −20° C. and more advantageously between −70° C. and −20° C.

In a second preferred embodiment the polymer (A1) having a glass transition temperature below 10° C. comprises at least 50 wt % of polymeric units coming from isoprene or butadiene and the stage (A) is the most inner layer of the polymer particle having the multilayer structure. In other words the stage (A) comprising the polymer (A1) is the core of the polymer particle.

By way of example, the polymer (A1) of the core of the second embodiment, mention may be made of isoprene homopolymers or butadiene homopolymers, isoprene-butadiene copolymers, copolymers of isoprene with at most 98 wt % of a vinyl monomer and copolymers of butadiene with at most 98 wt % of a vinyl monomer. The vinyl monomer may be styrene, an alkylstyrene, acrylonitrile, an alkyl (meth)acrylate, or butadiene or isoprene. In a preferred embodiment the core is a butadiene homopolymer.

More preferably the glass transition temperature Tg of the polymer (A1) comprising at least 50 wt % of polymeric units coming from isoprene or butadiene is between −100° C. and 10° C., even more preferably between −90° C. and 0° C., advantageously between −80° C. and 0° C. and most advantageously between −70° C. and −20° C.

In a third preferred embodiment the polymer (A1) is a silicone rubber based polymer. The silicone rubber for example is polydimethyl siloxane. More preferably the glass transition temperature Tg of the polymer (A1) of the second embodiment is between −150° C. and 0° C., even more preferably between −145° C. and −5° C., advantageously between −140° C. and −15° C. and more advantageously between −135° C. and −25° C.

With regard to the polymer (B1), mention may be made of homopolymers and copolymers comprising monomers with double bonds and/or vinyl monomers. Preferably the polymer (B1) is a (meth) acrylic polymer.

Preferably the polymer (B1) comprises at least 70 wt % monomers chosen from C1 to C12 alkyl (meth)acrylates. Still more preferably the polymer (B1) comprises at least 80 wt % of monomers C1 to C4 alkyl methacrylate and/or C1 to C8 alkyl acrylate monomers.

Most preferably the acrylic or methacrylic monomers of the polymer (B1) are chosen from methyl acrylate, ethyl acrylate, methyl methacrylate, ethyl methacrylate, butyl methacrylate and mixtures thereof, as long as polymer (B1) is having a glass transition temperature of at least 60° C.

Advantageously the polymer (B1) comprises at least 70 wt % of monomer units coming from methyl methacrylate.

Preferably the glass transition temperature Tg of the polymer (B1) is between 60° C. and 150° C. The glass transition temperature of the polymer (B1) is more preferably between 80° C. and 150° C., advantageously between 90° C. and 150° C. and more advantageously between 100° C. and 150° C.

Preferably the polymer (B1) is grafted on the polymer made in the previous stage.

In certain embodiments the polymer (B1) is crosslinked. In one embodiment the polymer (B1) comprises a functional comonomer. The functional copolymer is chosen from acrylic or methacrylic acid, the amides derived from this acids, such as for example dimethylacrylamide, 2-methoxyethyl acrylate or methacrylate, 2-aminoethyl acrylate or methacrylate which are optionally quaternized, polyethylene glycol (meth) acrylates, water soluble vinyl monomers such as N-vinyl pyrrolidone or mixtures thereof. Preferably the polyethylene glycol group of polyethylene glycol (meth) acrylates has a molecular weight ranging from 400 g/mol to 10 000 g/mol.

With regard to the polymer (C1), it is a copolymer comprising (meth)acrylic monomers. More preferably the polymer (C1) is a (meth) acrylic polymer. Still more preferably the polymer (C1) comprises at least 70 wt % monomers chosen from C1 to C12 alkyl (meth)acrylates. Advantageously preferably the polymer (C1) comprises at least 80 wt % of monomers from C1 to C4 alkyl methacrylate and/or C1 to C8 alkyl acrylate monomers.

Preferably the glass transition temperature Tg of the polymer (C1) is between 30° C. and 150° C. The glass transition temperature of the polymer (C1) is more preferably between 40° C. and 150° C., advantageously between 45° C. and 150° C. and more advantageously between 50° C. and 150° C.

Preferably the polymer (C1) is not crosslinked.

Preferably the polymer (C1) is not grafted on any of the polymers (A1) or (B1).

In one embodiment the polymer (C1) comprises also a functional comonomer.

The functional comonomer has the formula (1)

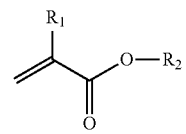

(1)

wherein $R_1$ is chosen from H or $CH_3$ and $R_2$ is H or an aliphatic or aromatic radical having at least one atom that is not C or H.

Preferably the functional monomer is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, polyethylene glycol (meth) acrylates. Preferably the polyethylene glycol group of polyethylene glycol (meth) acrylates has a molecular weight ranging from 400 g/mol to 10 000 g/mol.

In a first preferred embodiment the polymer (C1) comprises from 80 wt % to 100 wt % methyl methacrylate, preferably from 80 wt % to 99.9 wt % methyl methacrylate and from 0.1 wt % to 20 wt % of a C1 to C8 alkyl acrylate monomer. Advantageously the C1 to C8 alkyl acrylate monomer is chosen from methyl acrylate, ethyl acrylate or butyl acrylate.

In a second preferred embodiment the polymer (C1) comprises between 0 wt % and 50 wt % of a functional monomer. Preferably the (meth)acrylic polymer (P1) comprises between 0 wt % and 30 wt % of the functional monomer, more preferably between 1 wt % and 30 wt %, still more preferably between 2 wt % and 30 wt %, advantageously between 3 wt % and 30 wt %, more advantageously between 5 wt % and 30 wt % and most advantageously between 5 wt % and 30 wt %.

Preferably the functional monomer of the second preferred embodiment is a (meth)acrylic monomer. The functional monomer has the formula (2) or (3)

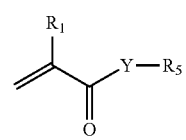

(2)

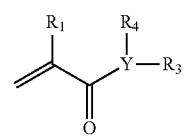

(3)

wherein in both formulas (2) and (3) $R_1$ is chosen from H or $CH_3$; and in formula (2) Y is O, $R_5$ is H or an aliphatic or aromatic radical having at least one atom that is not C or H; and in formula (3) Y is N and $R_4$ and/or $R_3$ is H or an aliphatic or aromatic radical.

Preferably the functional monomer (2) or (3) is chosen from glycidyl (meth)acrylate, acrylic or methacrylic acid, the amides derived from these acids, such as, for example, dimethylacrylamide, 2-methoxyethyl acrylate or methacrylate, 2-aminoethyl acrylates or methacrylates are optionally quaternized, acrylate or methacrylate monomers comprising a phosphonate or phosphate group, alkyl imidazolidinone (meth) acrylates, polyethylene glycol (meth) acrylates. Preferably the polyethylene glycol group of polyethylene glycol (meth) acrylates has a molecular weight ranging from 400 g/mol to 10 000 g/mol.

Preferably the polymer (C1) has a mass average molecular weight Mw between 2 000 g/mol and 1 000 000 g/mol.

In a first more preferred embodiment the polymer (C1) has a mass average molecular weight Mw of at least 100 000 g/mol, preferably more than 100 000 g/mol, more preferably more than 105 000 g/mol, still more preferably more than 110 000 g/mol, advantageously more than 120 000 g/mol, more advantageously more than 130 000 g/mol and still more advantageously more than 140 000 g/mol.

The polymer (C1), it has a mass average molecular weight Mw below 1 000 000 g/mol, preferably below 900 000 g/mol, more preferably below 800 000 g/mol, still more preferably below 700 000 g/mol, advantageously below 600 000 g/mol, more advantageously below 550 000 g/mol and still more advantageously below 500 000 g/mol and most advantageously below 450 000 g/mol.

The mass average molecular weight Mw of polymer (C1) is between 100 000 g/mol and 1 000 000 g/mol, preferable between 105 000 g/mol and 900 000 g/mol and more preferably between 110 000 g/mol and 800 000 g/mol advantageously between 120 000 g/mol and 700 000 g/mol, more advantageously between 130 000 g/mol and 600 000 g/mol and most advantageously between 140 000 g/mol and 500 000 g/mol.

In a second more preferred embodiment the polymer (C1) has a mass average molecular weight Mw of less than 100 000 g/mol, preferably less than 90 000 g/mol, more preferably less than 80 000 g/mol, still more preferably less than 70 000 g/mol, advantageously less than 60 000 g/mol, more advantageously less than 50 000 g/mol and still more advantageously less than 40 000 g/mol.

The polymer (C1), it has a mass average molecular weight Mw above 2 000 g/mol, preferably above 3000 g/mol, more preferably above 4000 g/mol, still more preferably above 5 000 g/mol, advantageously above 6 000 g/mol, more advantageously above 6 500 g/mol and even more advantageously above 7 000 g/mol, still more advantageously above 10 000 g/mol and most advantageously above 12 000 g/mol.

The mass average molecular weight Mw of the polymer (C1) is between 2 000 g/mol and 100 000 g/mol, preferable between 3 000 g/mol and 90 000 g/mol and more preferably between 4 000 g/mol and 80 000 g/mol advantageously between 5000 g/mol and 70 000 g/mol, more advantageously between 6 000 g/mol and 50 000 g/mol, even more advantageously between 10 000 g/mol and 50 000 g/mol and most advantageously between 10 000 g/mol and 40 000 g/mol.

The mass average molecular weight Mw of the polymer (C1) is chosen according to the first more preferred embodiment or the second more preferred embodiment on function of the acquired viscosity of the composition. If the viscosity has to be low or an additional rheology modifier is present the second more preferred embodiment is preferred. If the viscosity has to be higher or no additional rheology modifier is present the first more preferred embodiment is preferred.

The primary polymer particle according to the invention is obtained by a multistage process comprising at least two stages. At least a component a) the polymer (A1) and the component b) the polymer (B1) are part of a multistage polymer (MP1).

Preferably the polymer (A1) having a glass transition temperature below 10° C. made during the stage (A), is made before stage (B) or is the first stage of the multistage process.

Preferably the polymer (B1) having a glass transition temperature over 60° C. made during the stage (B) is made after the stage (A) of the multistage process.

In a first preferred embodiment the polymer (B1) having a glass transition temperature of at least 30° C. is an intermediate layer of the polymer particle having the multilayer structure.

Preferably the polymer (C1) having a glass transition temperature over 30° C. made during the stage (C) is made after the stage (B) of the multistage process.

More preferably the polymer (C1) having a glass transition temperature over 30° C. made during the stage (C) is the external layer of the primary polymer particle having the multilayer structure. In this case the components a2) and a3) are together as part of the composition (P1).

There could be additional intermediate stages, either between stage (A) and stage (B) and/or between stage (B) and stage (C).

The polymer (C1) and the polymer (B1) are not the same polymer, even if their composition could be very close and some of their characteristics are overlapping. The essential difference is that the polymer (B1) is always part of the multistage polymer (MP1).

This is more explained in the process for preparing the composition according to the invention comprising the polymer (C1) and the multi stage polymer.

The weight ratio r of the polymer (C1) of the external layer comprised in stage (C) in relation to the complete polymer particle comprising multistage polymer (MP1) having a core-shell structure and a polymer (C1) (components a2)+a3)) is at least 5 wt %, more preferably at least 7 wt % and still more preferably at least 10 wt %.

According to the invention the ratio r of the external stage (C) comprising polymer (C1) in relation to the complete polymer particle comprising multistage polymer (MP1) having a core-shell structure and a polymer (C1) (components a2)+a3)) is at most 30 w %, and more preferably at most 24 wt %.

Preferably the ratio r of polymer (C1) in view of the primary polymer particle comprising multistage polymer (MP1) having a core-shell structure and a polymer (C1) (components a2)+a3)) is between 5 wt % and 30 wt %, preferably between 5 wt % and 24 wt % and more preferably between 5 wt % and 20 wt %.

In a second preferred embodiment the polymer (B1) having a glass transition temperature of at least 30° C. is the external layer of the primary polymer particle having the multilayer structure in other words the multistage polymer (MP1).

Preferably at least a part of the polymer (B1) of layer (B) is grafted on the polymer made in the previous layer. If there are only two stages (A) and (B) comprising polymer (A1) and (B1) respectively, a part of polymer (B1) is grafted on polymer (A1). More preferably at least 50 wt % of polymer (B1) is grafted. The ratio of grafting can be determined by extraction with a solvent for the polymer (B1) and gravimetric measurement before and after extraction to determine the non-grafted quantity.

The glass transition temperature Tg of the respective polymers can be estimated for example by dynamic methods as thermo mechanical analysis.

In order to obtain a sample of the respective polymers (A1) and (B1) they can be prepared alone, and not by a multistage process, for estimating and measuring more easily the glass transition temperature Tg individually of the respective polymers of the respective stages. The polymer (C1) can be extracted for estimating and measuring the glass transition temperature Tg.

Preferably the multistage polymer (MP1) of the composition of the invention comprises no solvents. By no solvents is meant that eventually present solvent make up less than 1 wt % of the composition. The monomers of the synthesis of the respective polymers are not considered as solvents. The residual monomers in the composition present less than 2 wt % of the composition.

Preferably the multistage polymer (MP1) of the polymer composition according to the invention is dry. By dry is meant that the polymer composition according to the present invention comprises less than 3 wt % humidity and preferably less than 1.5 wt % humidity and more preferably less than 1.2 wt % humidity.

The humidity can be measured by a thermo balance that heats the polymer composition and measures the weight loss.

The multistage polymer (MP1) of the composition according to the invention comprising the does not comprise any voluntary added solvent. Eventually residual monomer from the polymerization of the respective monomers and water are not considered as solvents.

In a variation the two components a2) the multistage polymer (MP1) having a core-shell structure and a3) the polymer (C1) of the first part composition (P1) form together a polymer composition (PC1), which comprises a) the polymer (A1) having a glass transition temperature of less than 10° C., b) the polymer (B1) having a glass transition temperature of at least 60° C. and c) and the polymer (C1) having a glass transition temperature of at least 30° C. In this variation a) and b) together correspond to component a2) and c) corresponds to a3).

The component c) represents at most 40 wt % of the composition based on a) b) and c). Preferably the component c) represents at most 35 wt % of the composition based on a), b) and c); more preferably at most 30 wt %, still more preferably less than 30 wt %, advantageously less than 25 wt %, more advantageously less than 24 wt % and even more advantageously less than 20 wt %. In other words the ratio r of the polymer (C1) in a composition comprising only the multistage polymer (MP1) and the polymer (C1) is at most 40 wt %, preferably at most 35 wt %; more preferably at most 30 wt %, still more preferably less than 30 wt %, advantageously less than 25 wt %, more advantageously less than 24 wt % and even more advantageously less than 20 wt %.

The component c) represents more than 4 wt % of the composition based on a), b) and c). Preferably the component c) represents more than 5 wt % of the composition based on a), b) and c); more preferably more than 6 wt %, still more preferably more than 7 wt %, advantageously more than 8 wt % and more advantageously more than 10 wt %. In other words the ratio r of the polymer (C1) in a composition comprising only the multistage polymer (MP1) and the polymer (C1) is more than 5 wt %; more preferably more than 6 wt %, still more preferably more than 7 wt %, advantageously more than 8 wt % and more advantageously more than 10 wt %.

The component c) represents between 4 wt % and 40 wt % of the composition based on a) b) and c). Preferably the component c) represents between 5 wt % and 35 wt % of the composition based on a), b) and c); more preferably between 6 wt % and 30 wt %, still more preferably between 7 wt % and less than 30 wt %, advantageously between 7 wt % and less than 25 wt %, more advantageously between 7 wt % and less than 24 wt % and even more advantageously between 10 wt % and less than 20 wt %. In other words the ratio r of the polymer (C1) in a composition comprising only the multistage polymer (MP1) and the polymer (C1) is between 5 wt % and 35 wt %; more preferably between 6 wt % and 30 wt %, still more preferably between 7 wt % and less than 30 wt %, advantageously between 7 wt % and less than 25 wt %, more advantageously between 7 wt % and less than 24 wt % and even more advantageously between 10 wt % and less than 20 wt %.

At least the component a) and the component b) of composition (PC1) are part of a multistage polymer (MP1).

At least the component a) and the component b) are obtained by a multistage process comprising at least two stages; and these two polymer (A1) and polymer (B1) form a multistage polymer (MP1).

With regard to a first preferred method for manufacturing the polymer composition (PC1) according to the invention it comprises the steps of
   a) polymerizing by emulsion polymerization of a monomer or monomer mixture ($A_m$) to obtain one layer in stage (A) comprising polymer (A1) having a glass transition temperature of less than 10° C.
   b) polymerizing by emulsion polymerization of a monomer or monomer mixture ($B_m$) to obtain layer in stage (B) comprising a polymer (B1) having a glass transition temperature of at least 60° C.
   c) polymerizing by emulsion polymerization of a monomer or monomer mixture (Cm) to obtain a layer in stage (C) comprising a polymer (C1) having a glass transition temperature of at least 30° C.
characterized that the polymer (C1) has a mass average molecular weight Mw of at least 100 000 g/mol and that the component c) represents at most 30 wt % of the composition based on a) b) and c).

Preferably the step a) is made before step b).

More preferably step b) is performed in presence of the polymer (A1) obtained in step a).

Advantageously the first preferred method for manufacturing the polymer composition (PC1) according to the invention is a multistep process comprises the steps one after the other of
   a) polymerizing by emulsion polymerization of a monomer or monomer mixture ($A_m$) to obtain one layer in stage (A) comprising polymer (A1) having a glass transition temperature of less then 10° C.
   b) polymerizing by emulsion polymerization of a monomer or monomer mixture ($B_m$) to obtain layer in stage (B) comprising a polymer (B1) having a glass transition temperature of at least 60° C.
   c) polymerizing by emulsion polymerization of a monomer or monomer mixture (Cm) to obtain a layer in stage (C) comprising a polymer (C1) having a glass transition temperature of at least 30° C.
characterized that the polymer (C1) has a mass average molecular weight Mw of at least 100 000 g/mol.

The respective monomers or monomer mixtures ($A_m$), ($B_m$) and ($C_m$) for forming the layers (A), (B) and (C) respectively comprising the polymers (A1), (B1) and (C1) respectively, are the same as defined before. The characteristics of the polymers (A1), (B1) and (C1) respectively, are the same as defined before.

Preferably the first preferred method for manufacturing the polymer composition according to the invention comprises the additional step d) of recovering of the polymer composition.

By recovering is meant partial or separation between the aqueous and solid phase, latter comprises the polymer composition.

More preferably according to the invention the recovering of the polymer composition is made by coagulation or by spray-drying.

Spray drying is the preferred method for the recovering and/or drying for the manufacturing method for a polymer powder composition according to the present invention if the polymer (A1) having a glass transition temperature below 10° C. comprises at least 50 wt % of polymeric units coming from alkyl acrylate and the stage (A) is the most inner layer of the polymer particle having the multilayer structure.

Coagulation is the preferred method for the recovering and/or drying for the manufacturing method for a polymer powder composition according to the present invention if the polymer (A1) having a glass transition temperature below 10° C. comprises at least 50 wt % of polymeric units coming from isoprene or butadiene and the stage (A) is the most inner layer of the polymer particle having the multilayer structure.

The method for manufacturing the polymer composition according to the invention can comprise optionally the additional step e) of drying of the polymer composition.

Preferably the drying step e) is made if the step d) of recovering of the polymer composition is made by coagulation.

Preferably after the drying step an e) the polymer composition comprises less than 3 wt %, more preferably less than 1.5 wt % advantageously less than 1% of humidity or water.

The humidity of a polymer composition can be measure with a thermo balance.

The drying of the polymer can be made in an oven or vacuum oven with heating of the composition for 48 hours at 50° C.

With regard to a second preferred method for manufacturing the polymeric composition (PC1) comprising the polymer (C1) and the multi stage polymer (MP1), it comprises the steps of
a) mixing of the polymer (C1) and the multi stage polymer (MP1),
b) optionally recovering the obtained mixture of previous step in form of a polymer powder,
wherein the polymer (C1) and the multi stage polymer (MP1) in step a) are in form of a dispersion in aqueous phase.

The multi stage polymer (MP1) of the second preferred method for manufacturing the polymeric composition (PC1) is made according the first preferred method without performing step c) of the said first preferred method.

The quantities of the aqueous dispersion of the polymer (C1) and the aqueous dispersion of the multi stage polymer (MP1) are chosen in a way that the weight ratio of the multi stage polymer based on solid part only in the obtained mixture is at least 5 wt %, preferably at least 10 wt %, more preferably at least 20 wt % and advantageously at least 50 wt %.

The quantities of the aqueous dispersion of the polymer (C1) and the aqueous dispersion of the multi stage polymer (MP1) are chosen in a way that the weight ratio of the multi stage polymer based on solid part only in the obtained mixture is at most 99 wt %, preferably at most 95 wt % and more preferably at most 90 wt %.

The quantities of the aqueous dispersion of the polymer (C1) and the aqueous dispersion of the multi stage polymer are chosen in a way that the weight ratio of the multi stage polymer based on solid part only in the obtained mixture is between 5 wt % and 99 wt %, preferably between 10 wt % and 95 wt % and more preferably between 20 wt % and 90 wt %.

The polymer composition (PC1) is obtained as an aqueous dispersion of the polymer particles, if recovering step b) takes not place. The solid content of the dispersion is between 10 wt % and 65 wt %.

In one embodiment the recovering step b) of the process for manufacturing the polymer composition comprising the polymer (C1) and the multi stage polymer (MP1), is not optional and is preferably made by coagulation or by spray drying.

The process of the second preferred method for manufacturing the polymer composition (PC1) comprising the polymer (C1) and the multi stage polymer can optionally comprise the additional step c) for drying the polymer composition.

By dry is meant that the polymer composition according to the present invention comprises less than 3 wt % humidity and preferably less than 1.5 wt % humidity and more preferably less than 1.2 wt % humidity.

The humidity can be measured by a thermo balance that heats the polymer composition and measures the weight loss.

The second preferred method for manufacturing the polymer composition comprising the polymer (C1) and the multi stage polymer yields preferably to a polymer powder. The polymer powder of the invention is in form of particles. A polymer powder particle comprises agglomerated primary polymer particles made by multistage process and the polymer (C1).

As already mentioned the polymer composition (PC1) according to the invention can also be in form of larger polymer particles: a polymer powder. The polymer powder particle comprises agglomerated primary polymer particles made by the multistage process according the first preferred method or agglomerated primary polymer particles made by blending the multistage polymer (MP1) obtained multistage process with polymer particles made of polymer (C1) according the second preferred method.

With regard to the polymer powder of the invention, it has a volume median particle size D50 between 1 µm and 500 µm. Preferably the volume median particle size of the polymer powder is between 10 µm and 400 µm, more preferably between 15 µm and 350 µm and advantageously between 20 µm and 300 µm.

The D10 of the particle size distribution in volume is at least 7 µm and preferably 10 µm.

The D90 of the particle size distribution in volume is at most 500 µm and preferably 400 µm, more preferably 350 µm and still more preferably at most 250 µm.

[Methods of Evaluation]

Glass Transition Temperature

The glass transitions (Tg) of the polymer particles are measured with equipment able to realize a thermo mechanical analysis. A RDAII "RHEOMETRICS DYNAMIC ANALYSER" proposed by the Rheometrics Company has been used. The thermo mechanical analysis measures precisely the visco-elastics changes of a sample in function of the temperature, the strain or the deformation applied. The apparatus records continuously, the sample deformation, keeping the stain fixed, during a controlled program of temperature variation.

The results are obtained by drawing, in function of the temperature, the elastic modulus (G'), the loss modulus and the tan delta. The Tg is higher temperature value read in the tan delta curve, when the derived of tan delta is equal to zero.

Molecular Weight

The mass average molecular weight (Mw) of the polymers is measured with by size exclusion chromatography (SEC).

Particle Size Analysis

The particle size of the primary particles after the multistage polymerization is measured with a Zetasizer.

The particle size of the polymer powder after recovering is measured with Malvern Mastersizer 3000 from MALVERN. For the estimation of weight average powder particle size, particle size distribution and ratio of fine particles a Malvern Mastersizer 3000 apparatus with a 300 mm lenses, measuring a range from 0.5-880 µm is used.

Tensile Strength

The tensile specimens were tested with a cross-head speed of 5 mm/min at 25° C. The samples were held using mechanical jaws. The tensile Modulus (E), tensile stress and strain were measured at break and at yield point according to the ISO 527-2 standard requirements, using 1BA dog bone specimens.

Charpy Impact Tests

The length of the Charpy specimens was 80 mm, a thickness of 4 mm and a width of 10 mm, following the ISO 179 standard requirement (type 1). Specimens were notched using an automatic CEAST NotchVis device. This notching machine equipment was fitted with a cobalt steel knife with a V notch of (45°±1°) and a radius r=(0.25±0.05) mm. The notch depth was 0.8 mm.

The Charpy impact tests were carried out using a Zwick I pendulum impact tester fitted with a 233 grams hammer. The results presented are the average of 7 tested specimens.

Toughness Measurements

K1C and G1C were measured with respect to the ASTM D5045-99(2007)e1 standard requirements in tension mode, i.e., using CT type specimen.

Dispersion of Multistage Polymer (Core/Shell Powder) Assessment

The composition comprising the multistage polymer (core/shell powder) is tested for dispersion easiness in the epoxy resin. This was evaluated by visual inspection as the time requested to reach a homogeneous dispersion state for the core/shell when added to the sole epoxy resin. In particular, attention was paid to the total disappearance of any core/shell powder agglomerates. A poor result regarding this test was qualified as difficult and long whereas a good result was qualified as easy and fast.

Viscosity Measurements

The viscosity is measured at 25° C. using a MCR 301 rheometer from Anton Paar between shear rate of 0.1 s$^{-1}$ and 100 s$^{-1}$. Plate/Plate geometry is used (30 mm diameter). The viscosity value obtained at 100 s−1 is used to assess the effect of core/shell additive on the viscosity of the host epoxy matrix. These measurements were carried out on neat resin and on compositions containing only the host resin and the core/shell (i.e. measurement were made before hardener and accelerator introduction).

Differential Scanning Calorimetry

Differential scanning calorimetry (DSC) analyses on final cure epoxy adhesive were carried out using a TA Instruments Q1000 DSC system at a heating rate of 10° C./min. The glass transition temperature Tg was determined at the mid-point.

Molds

Molds were made of stainless steel. They were coated at 130° C. with Loctite Frekote mold release agent from Henkel, to facilitate demolding operations.

They were used to produce epoxy solid plates with 4 mm in thickness from where various testing specimens were taken. For the epoxy resin curing stage, a ventilated oven was used. A Heidolph RZR 2051 stirring motor used at a speed rotation of 200 rpm and fitted with a dispersive blade was used for the blending process.

The lap-shear and tensile tests were carried out using an Instron tensile testing machine fitted respectively with a 50 kN and 5 kN force sensor. An extensometer was used for the initial stage of the tensile test to assess the tensile modulus (E) with higher accuracy.

Aluminum plates used as substrate to prepare the lap shear specimens were made of a 6061 alloy. A constant thickness of the adhesive layer was ensured by the use of PTFE (polytretrafluoretheylen) film spacer around the bounding area. The PTFE films were 200 µm thick and were purchased from Multi-Labo. Once bonded, the plates were held together with 40 mm bulldog clips to maintain the bounded plates during the curing step.

Lap-Shear Aluminum Plates Surface Preparation

The lap-shear sample are made from two aluminum plates, an adhesive layer with a standardized thickness (200 microns) and a clamping device. The surface preparation protocol of the plates used for the Lap shear test is key for the reliability of the test results. The different preparation steps used were the following: (i) water cleaning, (ii) acetone cleaning and finally (iii) surface abrasion.

The water cleaning consisted of rubbing with a damp while acetone cleaning was done by rubbing with an impregnated rag. A fine surface abrasion process as described in the EN13887 standard was performed using R222 Emery clothe sheet grit 180 from Norton Saint Gobain: the surface was abraded along the main plate axis until it became totally bright. Then, it was abraded perpendicularly until the first abrasion marks became invisible. Finally, the plates were abraded circularly until the first two steps marks became invisible. The dust was removed by compressed dry air.

Aluminum Plates Bounding Step

A Teflon film was used as a spacer between the 2 plates to ensure a regular thickness for the adhesive layer. According to the EN 1465 standard, the overlapping adhesion surface was 12.5 mm×25 mm×2 mm.

A small quantity of adhesive composition is deposited and leveled using a spatula at the surface of the extremity of one of the two aluminum plates. During this step, the Teflon spacer is held manually, to avoid movement. The second aluminum plate is pressed against the first one to ensure the right overlapping bounding area. The two plates are clamped together using 2 bulldog clips. Clips are removed when the curing process is finished. The curing protocol used for the lap-shear samples is the same as for the curing of the methacrylate specimens described hereafter.

Lap-Shear Testing Protocol

The shear adhesive strength of the lap-shear specimens was evaluated using an Instron tensile test machine at 25° C., in accordance with EN 1465 standard requirements. The cross-head speed was 2 mm/min. The samples were held using mechanical jaws. The applied stress and the resulting strain were measured until the break. The results are the average values of 5 tested specimens.

Specimen Preparation

The epoxy plaques prepared in the steel molds were cut to the appropriate shapes and sizes to prepare the testing specimens needed to measure the toughness (K1C, G1C), the tensile modulus (E), and the tensile properties (Stress and elongation at break) and the Charpy impact strength. The cutting operation was performed using a DMC Charlyrobot milling machine from Mecanumeric. All mechanical testing results were the average of 5 tested specimens.

EXAMPLES

Synthesis

Example 1: Synthesis of Multistage Polymer Particles

First Stage A—Polymerization of a Polymer Type A1:

To a litres high-pressure reactor was charged: de-ionized water 116.5 parts, emulsifier potassium salt of beef tallow fatty acid 0.1 part, 1,3-butadiene 21.9 parts, t-dodecyl mercaptan 0.1 parts, and p-menthane hydroperoxide 0.1 parts as an initial kettle charge. The solution was heated, with agitation, to 43° C. at which time a redox-based catalyst solution was charged (water 4.5 parts, sodium tetrapyrophosphate 0.3 parts, ferrous sulphate 0.004 parts and dextrose 0.3 parts), effectively initiating the polymerization. Then the solution was further heated to 56° C. and held at this temperature for a period of three hours. Three hours after polymerization initiation, a second monomer charge (77.8 parts BD, t-dodecyl mercaptan 0.2 parts), one-half of an additional emulsifier and reductant charge (de-ionized water 30.4 parts, emulsifier potassium salt of beef tallow fatty acid 2.8 parts, dextrose 0.5 parts) and additional initiator (p-menthane hydroperoxide 0.8 parts) were continuously added over eight hours. Following the completion of the second monomer addition, the remaining emulsifier and reductant charge plus initiator was continuously added over an additional five hours. Thirteen hours after polymerization initiation, the solution was heated to 68° C. and allowed to react until at least twenty hours had elapsed since polymerization initiation, producing polybutadiene rubber latex, $R_1$. The resultant polybutadiene rubber latex (A1) contained 38% solids and had a weight average particle size of about 160 nm.

Second Stage B—Polymerization of Polymer Type B1:

into a 3.9 litres reactor was charged 75.0 parts, on a solids basis, of polybutadiene rubber latex $R_1$, 37.6 parts de-ionized water, and 0.1 parts sodium formaldehyde sulfoxylate. The solution was agitated, purged with nitrogen, and heated to 77° C. When the solution reached 77° C., a mixture of 22.6 parts methyl methacrylate, 1.4 parts divinyl benzene and 0.1 parts t-butyl hydroperoxide initiator was continuously added over 70 minutes, followed by o hold period of 80 minutes. Thirty minutes after the onset of the hold period, 0.1 parts of sodium formaldehyde sulfoxylate and 0.1 parts t-butyl hydroperoxide were added to the reactor at once. Following the 80-minute hold period, a stabilization emulsion was added to the graft copolymer latex. The stabilization emulsion was prepared by mixing 3.2 parts de-ionized water (based on graft copolymer mass), 0.1 parts oleic acid, 0.1 parts potassium hydroxyde, and 0.9 parts octadecyl-3-(3,5-di-tertbutyl-4-hydroxyphenyl)propionate. The resultant core shell polymer (A+B) had a weight average particle size of about 180 nm.

Third Stage C—Polymerization of Polymer Type C1

Synthesis of the polymer C1: semi continuous process: charged into a reactor, with stirring, were 10 000 g of core shell polymer (A+B) in de-ionized water, 0.01 g of FeSO4 and 0.032 g of ethylenediaminetetraacetic acid, sodium salt (dissolved in 10 g of de-ionized water), 3.15 g of sodium formaldehydesulfoxylate dissolved if 110 g of de-ionized water and 21.33 g of emulsifier potassium salt of beef tallow fatty acid (dissolved in 139.44 g of water), and the mixture was stirred until complete dissolution of added raw materials except core-shell polymer. Three vacuum-nitrogen purges were carried out in succession and the reactor left under a slight vacuum. The reactor was then heated. At the same time, a mixture comprising 1066.7 g of methyl methacrylate and 10.67 g of n-octyl mercaptan was nitrogen-degassed for 30 minutes. The reactor is heated at 63° C. and maintained at that temperature. Next, the monomers mixture was introduced into the reactor in 180 min using a pump. In parallel, a solution of 5.33 g of ter-butyl hydroperoxide (dissolved in 100 g of de-ionized water) is introduced (same addition time). The lines was rinsed with 50 g and 20 g of water. Then the reaction mixture was heated at a temperature of 80° C. and the polymerization was then left to completion for 60 minutes after the end of the monomers addition. The reactor was cooled down to 30° C. The mass average molecular weight of the copolymer C1 is $M_w$=28 000 g/mol.

The final polymer composition consisting of the multistage polymer (MP1) and polymer (C1) was then recovered, the polymer composition being dried by spray drying giving a power of core/shell-2.

Comparative example 1: The same syntheses was made is in example 1, however the third stage C was not made. A powder of core/shell-1 is obtained.

Formulation 1—DEGBA/DDA System

The Diglycidyl Ether of Bisphenol A (DGEBA) resin used was an Araldite LY556 from Huntsman having a molar mass of 383 g/mol and a mean number of hydroxyl groups per one epoxy group of n=0.075. The hardener was a dicyandiamide (DDA) Dyhard 100S from AlzChem. The functionality of this hardener is 4. A Dyhard UR300 accelerator also purchased from AlzChem was used.

Preparation of the Reactive Blend

The toughening of the epoxy-amine network consists here in the blend of the host epoxy resin with the powder of core/shell modifier, before the addition of hardener and accelerator. A blending temperature of 80° C. was set to facilitate the blending step.

The composition preparation protocol was the following:
  200 g of DGEBA resin were poured into a 2 L reactor. The temperature of the reactor was then set and kept at 80° C. using a heating mantle, under continuous stirring at 200 rpm.

The reactor was then putted under vacuum during 15 minutes still under continuous stirring at 200 rpm. These stirring conditions were maintained until the end of the blend preparation.

The respective core/shell-1 or -2 powder was then added to the epoxy resin using an aluminum funnel at 5 wt %, 10 wt % or 15 wt % of the final composition (e.g., 38.65 g of core/shell was added to reach 15 wt %). This addition was done under atmospheric pressure and stirring during 60 minutes at 80° C. Then, the blend was putted under vacuum during 15 minutes.

The DDA hardener (13 g) as well as the accelerator (6 g) were then added to the blend (at stoichiometric ratios) using an aluminum funnel under atmospheric pressure and stirring. The blend was putted under vacuum and stirring during 15 minutes at 80° C.

The resulting reactive blend was then poured into a steel mold preheated at 80° C., and placed into a preheated ventilated oven.

It should be noted that a reference "neat resin" composition was simply prepared using the same above-described protocol but without adding the core/shell powder (0 wt % core/shell composition).

Curing Step

The ventilated oven was pre-heated at 120° C. during 1 hour before mold introduction. The mold containing the reactive blend was kept at 120° C. during 1 hour followed by another hour at 180° C.

The epoxy/amine composition of present formulation 1, toughened by a core/shell modifier can be considered as a very simple epoxy based structural adhesive composition. All the other usual additives have not been used here in order to better evidence the effect of the sole core/shell modifier on the applicative performances of the epoxy-amine network. The applicative results corresponding to formulation 1 are reported in Table 1. It can be concluded that the innovative Core/Shell-2 according to the present invention provides superior performance than the standard Core/Shell-1 reference in the DGEBA/DDA composition. More particularly, Core/Shell-2 allows to reach higher toughening effect ($K_{1c}$, $G_{1c}$, Charpy impact strength), adhesion shear stress and elongation at break while less increasing the viscosity of the host DGEBA resin when compared to Core/Shell-1. As expected for a non-reactive toughening agent, the core/shell-2 does not sensitively affect the Tg of the host epoxy-amine network. The elastic modulus loss always observed when a rubber phase is introduced in a rigid matrix like epoxy-amine system, remains reasonable in the case of Core/Shell-2.

a reference in direct comparison with Core/Shell-2 that is according to the present invention.

Preparation of the Reactive Blend

The toughening of the epoxy-amine network consists here in the blend of the host epoxy resin with the powder of core/shell modifier, before the addition of the hardener. A blending temperature of 135° C. was set to facilitate the blending step.

The composition preparation protocol was the following:

300 g of DGEBA resin were poured into a 2 L reactor. The temperature of the reactor was then set and kept at 135° C. using a heating mantle, under continuous stirring at 200 rpm.

The reactor was then putted under vacuum during 15 minutes still under continuous stirring at 200 rpm. These stirring conditions were maintained until the end of the blend preparation.

The core-shell powder (20.91 g) was then added to the epoxy resin using an aluminum funnel (5 wt % of the final composition) under atmospheric pressure and stirred during 60 minutes at 135° C. Then, the blend was putted under vacuum during 15 minutes.

The DDS hardener (97.4 g) was then added to the blend (at stoichiometric ratio) using an aluminum funnel under atmospheric pressure and stirring. The blend was putted under vacuum and stirring during 15 minutes at 135° C.

The resulting reactive blend was then poured into a steel mold preheated at 135° C., and placed into a preheated ventilated oven.

It should be noted that a reference "neat resin" composition was simply prepared using the same above-described protocol but without adding the core/shell powder (0 wt % core/shell composition).

TABLE 1 applicative results corresponding to formulation 1

| | Comparative Neat Resin | Comparative Core/Shell-1 | | | Inventive Core/Shell-2 | | |
|---|---|---|---|---|---|---|---|
| | Core/shell content | | | | | | |
| | 0 wt % | 5 wt % | 10 wt % | 15 wt % | 5 wt % | 10 wt % | 15 wt % |
| Core/shell dispersion in DGEBA | NA | Difficult/Long | Difficult/Long | Difficult/Long | Easy/Fast | Easy/Fast | Easy/Fast |
| Viscosity (Pa · s) | 10.5 | 22.8 | 51.1 | 106.6 | 15.5 | 35.5 | 77.8 |
| E modulus (MPa) | 2079 +/− 193 | | 1779 +/− 99 | | | 1811 +/− 103 | |
| Elongation at break (%) | 6.0 +/− 1.1 | | 7.4 +/− 0.8 | | | 10.7 +/− 1.5 | |
| Stress at break (MPa) | 84.3 +/− 6.2 | | 67.7 +/− 2.2 | | | 69.4 +/− 3.0 | |
| Charpy Impact Strength (kJ/m$^2$) | 1.97 +/− 0.17 | | 4.19 +/− 0.35 | | | 5.91 +/− 0.61 | |
| $K_{1c}$ (MPa · m$^{1/2}$) | 0.74 +/− 0.09 | | 1.54 +/− 0.12 | | | 2.41 +/− 0.15 | |
| $G_{1c}$ (J/m$^2$) | 390 +/− 80 | | 1400 +/− 260 | | | 2480 +/− 390 | |
| Shear Strength adhesion (MPa) | 12.8 +/− 0.1 | | 13.2 +/− 0.4 | | | 14.5 +/− 0.4 | |
| Tg (° C.) | 138.0 | | 136.7 | | | 136.6 | |

Formulation 2: DEGBA/DDS System

The same Diglycidyl Ether of Bisphenol A (DGEBA) resin used for formulation 1 was also used for formulation 2. The hardener was a 4,4'-Diaminodiphenyl sulfone (DDS), ARADUR 976-1 from Huntsman.

The same core/shell powder samples used in formulation 1 were also used for formulation 2: Core/Shell-1 was used as Curing Step The ventilated oven was pre-heated at 135° C. during 1 hour before mold introduction. The mold containing the reactive blend was introduced in the oven at 135° C. The oven temperature was increased from 135° C. to 175° C. at 2° C./min. The oven temperature was kept at 175° C. during 2 hours. Then, the oven temperature was increased from 175° C. to 220° C. at 2° C./min. The oven temperature was kept at 220° C. during 3 hours. Finally the oven temperature was decreased from 220° C. to room temperature at about 2° C./min.

The epoxy/amine composition of present formulation 2, toughened by a core/shell modifier can be considered as a very simple epoxy based structural adhesive composition. All the other usual additives have not been used here in order to better evidence the effect of the sole core/shell modifier on the applicative performances of the epoxy-amine network.

The applicative results corresponding to formulation 2 are reported in Table 2. Like for formulation 1, it can be concluded that the innovative Core/Shell-2 of the present invention provides superior performance than the standard Core/Shell-1 reference in the DGEBA/DDS composition. More particularly, Core/Shell 2 allows to reach higher toughening effect ($K_{1c}$, $G_{1c}$, Charpy impact strength), adhesion shear stress and elongation at break while less increasing the viscosity of the host DGEBA resin when compared to Core/Shell 1. As expected for a non-reactive toughening agent, the core/shell 2 does not sensitively affect the Tg of the host epoxy-amine network. The elastic modulus loss always observed when a rubber phase is introduced in a rigid matrix like epoxy-amine system, remains reasonable in the case of Core/Shell 2.

TABLE 2 applicative results corresponding to formulation 2

| | Comparative Neat Resin | Comparative Core/Shell 1 | Inventive Core/Shell 2 |
|---|---|---|---|
| Core/shell content | 0 wt % | 5 wt % | 5 wt % |
| Core/shell dispersion in DGEBA | NA | Difficult/ Long | Easy/ Fast |
| Viscosity (Pa · s) | 10.5 | 22.8 | 15.5 |
| E modulus (MPa) | 3184 +/− 97 | 2527 +/− 103 | 2847 +/− 39 |
| Elongation at break (%) | 1.2 +/− 0.2 | 5.0 +/− 0.2 | 6.4 +/− 0.6 |
| Stress at break (MPa) | 32.9 +/− 1.0 | 72.1 +/− 2.6 | 79.0 +/− 2.2 |
| Charpy Impact Strength (kJ/m$^2$) | 1.8 +/− 0.2 | 2.4 +/− 0.3 | 3.5 +/− 0.2 |
| $K_{1c}$ (MPa · m$^{1/2}$) | 0.63 +/− 0.06 | 0.85 +/− 0.05 | 0.96 +/− 0.04 |
| $G_{1c}$ (J/m$^2$) | 330 +/− 60 | 390 +/− 42 | 460 +/− 58 |
| Shear Strength adhesion (MPa) | 7.9 +/− 0.4 | 11.9 +/− 1.4 | 14.4 +/− 1.2 |
| Tg (° C.) | 208.9 | 207.2 | 207.8 |

The invention claimed is:

1. A polymer composition suitable as epoxy adhesive composition comprising,
   a) a first part composition (P1) comprising,
      a1) an epoxy resin,
      a2) a multistage polymer (MP1) having a core-shell structure,
      a3) a polymer (C1) chosen from a (meth)acrylic polymer,
   and
   b) a second part composition (P2) comprising,
      b1) a curing agent,
   wherein polymer (C1) has a mass average molecular weight Mw between 100,000 g/mol and 1,000,000 g/mol, and wherein the ratio r of the polymer (C1) in a composition comprising only the multistage polymer (MP1) and the polymer (C1) is from 5 wt % to 24 wt %.

2. The composition according to claim 1, wherein polymer (C1) has a mass average molecular weight Mw between 105,000 g/mol and 900,000 g/mol.

3. The composition according to claim 1, wherein polymer (C1) has a mass average molecular weight Mw between 140,000 g/mol and 500,000 g/mol.

4. The composition according to claim 1 wherein the ratio r of the polymer (C1) in a composition comprising only the multistage polymer (MP1) and polymer (C1) is from 7 wt % to 24 wt %.

5. The composition according to claim 1 wherein the ratio r of the polymer (C1) in a composition comprising only the multistage polymer (MP1) and polymer (C1) is from 10 wt % to 24 wt %.

6. The polymer composition according to claim 1 wherein polymer (C1) comprises at least 80 wt % of monomers C1 to C4 alkyl methacrylate and/or C1 to C8 alkyl acrylate monomers.

7. The polymer composition according to claim 1 wherein polymer (C1) comprises a functional comonomer.

8. The polymer composition according to claim 7 wherein the functional comonomer is chosen from glycidyl (meth)acrylate, acrylic or methacrylic acid, the amides derived from these acids, dimethylacrylamide, 2-methoxyethyl acrylate or methacrylate, 2-aminoethyl acrylates or methacrylates are optionally quaternized, and polyethylene glycol (meth) acrylates.

9. The polymer composition according to claim 7, wherein at least 80 wt % of acrylic or methacrylic comonomers of polymer (C1) are chosen from methyl acrylate, propyl acrylate, isopropyl acrylate, butyl acrylate, tert-butyl acrylate, methyl methacrylate, ethyl methacrylate, butyl methacrylate and mixtures thereof.

10. A structural adhesive polymer composition comprising a composition according to claim 1.

11. A method for manufacturing a polymer composition suitable as epoxy adhesive composition comprising the steps of:
   (a) providing a first part composition (P1) comprising,
      a1) an epoxy resin,
      a2) a multistage polymer (MP1) having a core-shell structure,
      a3) a polymer (C1) chosen from a (meth)acrylic polymer;
   (b) providing a second part composition (P2) comprising,
      b1) a curing agent,
   (c) curing the mixture of (P1) and (P2),
   wherein polymer (C1) has a mass average molecular weight Mw between 100,000 g/mol and 1,000,000 g/mol, and wherein the ratio r of the polymer (C1) in a composition comprising only the multistage polymer (MP1) and the polymer (C1) is from 5 wt % to 24 wt %.

12. The method according to claim 11, wherein polymer (C1) has a mass average molecular weight Mw between 105,000 g/mol and 900,000 g/mol.

13. The method according to claim 11, wherein polymer (C1) has a mass average molecular weight Mw between 140,000 g/mol and 500,000 g/mol.

14. The method according to claim 11 wherein multistage polymer (MP1) has a core-shell structure and a3) the polymer (C1) of the first part composition (P1) form together a polymer composition (PC1) are made by a method for manufacturing comprising the steps of:
   a) polymerizing by emulsion polymerization of a monomer or monomer mixture ($A_m$) to obtain one layer in stage (A) comprising polymer (A1) having a glass transition temperature of less than 10° C., b) polymerizing by emulsion polymerization of a monomer or monomer mixture ($B_m$) to obtain layer in stage (B) comprising a polymer (B1) having a glass transition temperature of at least 60° C., c) polymerizing by emulsion polymerization of a monomer or monomer mixture ($C_m$) to obtain a layer in stage (C) comprising a polymer (C1) having a glass transition temperature of at least 30° C.

15. The method according to claim 11 wherein multistage polymer (MP1) having a core-shell structure and a3) the polymer (C1) of the first part composition (P1) form together a polymer composition (PC1) are made by a method for manufacturing comprising the steps of:

a) mixing of the polymer (C1) and the multi stage polymer (MP1), b) optionally recovering the obtained mixture of previous step in form of a polymer powder, wherein the polymer (C1) and the multi stage polymer (MP1) in step a) are in form of a dispersion in aqueous phase.

16. The method according to claim 11 wherein the ratio r of the polymer (C1) in a composition comprising only the multistage polymer (MP1) and the polymer (C1) is from 10 wt % to 24 wt %.

\* \* \* \* \*